(12) United States Patent
Sakawaki et al.

(10) Patent No.: US 9,013,832 B2
(45) Date of Patent: Apr. 21, 2015

(54) PERPENDICULAR MAGNETIC RECORDING MEDIUM AND MAGNETIC STORAGE APPARATUS

(71) Applicant: Showa Denko K.K., Tokyo (JP)

(72) Inventors: Akira Sakawaki, Chiba (JP); Akira Yamane, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 14/297,879

(22) Filed: Jun. 6, 2014

(65) Prior Publication Data

US 2014/0362472 A1 Dec. 11, 2014

(30) Foreign Application Priority Data

Jun. 10, 2013 (JP) ................................ 2013-121798
Apr. 14, 2014 (JP) ................................ 2014-082496

(51) Int. Cl.
*G11B 5/66* (2006.01)
*G11B 5/65* (2006.01)

(52) U.S. Cl.
CPC ............... *G11B 5/66* (2013.01); *Y10T 428/115* (2015.01); *G11B 5/65* (2013.01)

(58) Field of Classification Search
USPC .......................................................... 360/135
See application file for complete search history.

(56) References Cited

U.S. PATENT DOCUMENTS

| 7,923,135 B2 * | 4/2011 | Watanabe ..................... 428/828 |
| 2006/0114606 A1 | 6/2006 | Ide |
| 2007/0230006 A1 | 10/2007 | Takahashi et al. |
| 2007/0230007 A1 | 10/2007 | Takahashi et al. |
| 2008/0205252 A1 | 8/2008 | Buehlmann et al. |

FOREIGN PATENT DOCUMENTS

| JP | 2006-139854 | 6/2006 |
| JP | 2007-265512 | 10/2007 |
| JP | 2008-219007 | 9/2008 |

OTHER PUBLICATIONS

Yusuke Sugawara et al., "Low-temperature fabrication of BiFeO3 based multiferroic thin films with (111) orientation by sputtering deposition process with VHF plasma irradiation", Proceedings of the 60th Symposium of Applied Physics Society Spring Scientific Presentation, 28a-D3-8, pp. 6-17, 2013.

* cited by examiner

*Primary Examiner* — Mark Blouin
(74) *Attorney, Agent, or Firm* — IPUSA, PLLC (57) ABSTRACT

A perpendicular magnetic recording medium includes a non-magnetic substrate, an underlayer provided above the non-magnetic substrate, and a perpendicular recording layer provided above the underlayer. The perpendicular recording layer includes a first magnetic layer including Co and Pt and having a granular structure, and a second magnetic layer having magnetic and ferroelectric properties.

10 Claims, 1 Drawing Sheet

PERPENDICULAR MAGNETIC RECORDING MEDIUM AND MAGNETIC STORAGE APPARATUS

CROSS-REFERENCE TO RELATED APPLICATIONS

This application is based upon and claims the benefit of priority of Japanese Patent Applications No. 2013-121798 filed on Jun. 10, 2013 and No. 2014-082496 filed on Apr. 14, 2014, the entire contents of which are incorporated herein by reference.

BACKGROUND OF THE INVENTION

1. Field of the Invention

The present invention relates to a perpendicular magnetic recording medium and a magnetic storage apparatus using the perpendicular magnetic recording medium.

2. Description of the Related Art

Recently, application and importance of magnetic storage apparatuses, such as a magnetic disk drive, a flexible disk drive, and a magnetic tape drive, are increasing, and recording densities of magnetic recording media used in such magnetic storage apparatuses have improved considerably. Particularly in an HDD (Hard Disk Drive) to which an MR (Magneto-Resistive) head and a PRML (Partial Response Maximum Likelihood) technique have been applied, a surface recording density has increased considerably. Recently, with the use of GMR (Giant Magneto-Resistive) head, a TuMR (Tunneling Magneto-Resistive) head, or the like, the surface recording density continues to increase at a rate of approximately 1.5 times per year.

On the other hand, a magnetic recording system used in the HDD is conventionally the in-plane magnetic recording system, but is recently being replaced by the so-called perpendicular magnetic recording system. The perpendicular magnetic recording system is suited for increasing the surface recording density, because crystal grains of a magnetic recording layer for recording information have an axis of easy magnetization aligned in a direction perpendicular to a substrate surface.

A perpendicular magnetic recording medium generally includes a nonmagnetic substrate, a backing layer made of a soft magnetic material, an underlayer, and a perpendicular magnetic recording layer, where the underlayer controls a perpendicular orientation of the perpendicular magnetic recording layer.

However, with the increase in the surface recording density, there is a limit to recording and reproducing information "magnetically (or by magnetization)" according to the conventional perpendicular magnetic recording system.

In order to record at a high density, an area on the magnetic recording medium occupied by one bit (that is, a minimum unit of data to be magnetically recorded) needs to be reduced. However, the grain diameter or magnetic cluster in the magnetic recording layer of the perpendicular magnetic recording medium needs to be reduced, in order to reduce the area occupied by one bit. This is because, if the grain diameter or magnetic cluster in the magnetic recording layer is maintained at the existing size, an SNR (Signal-to-Noise Ratio) of data that are recorded and reproduced deteriorates, and a sufficiently high recording and reproducing characteristics cannot be obtained from the perpendicular magnetic recording medium.

When the grain diameter of magnetic cluster is reduced, it is known that stability (that is, thermal stability) of recorded data deteriorates due to the effects of heat, and the so-called heat fluctuation occurs. A magnetic material having a high crystal magnetic anisotropy constant Ku (hereinafter also referred to as a "high-Ku material") must be used for the magnetic recording layer in order to maintain the thermal stability. However, when the high-Ku material is used, the coercivity of the magnetic recording layer increases, thus requiring a high recording magnetic field in order to record the data.

On the other hand, the recording magnetic field of the magnetic head is highly dependent on the magnetic material used for a recording element (or magnetic pole). For this reason, there is a limit to the recording magnetic field that can be generated by the magnetic head.

In order to suppress the above described problem, there are proposals to record the data on the magnetic recording layer using an electric field. For example, Japanese Laid-Open Patent Publication No. 2006-139854 proposes generating the electric field on the side of the magnetic recording medium at the time of the recording using magnetization, in order to reduce the coercivity of the magnetic recording layer. On the other hand, Japanese Laid-Open Patent Publication No. 2007-265512 proposes an MAMR (Microwave Assisted Magnetic Recording) utilizing resonance between a high-frequency electric field and a magnetic spin of the magnetic recording medium, in order to reduce the coercivity of the magnetic recording layer. The first proposal requires the side of the magnetic recording medium to be grounded within the magnetic storage apparatus, and the configuration of the head to simultaneously generate and control the magnetic field and the electric field becomes complex. On the other hand, the second proposal requires a mechanism to generate the high-frequency electric field, and the configuration of the head having such a mechanism built therein becomes complex.

For example, Japanese Laid-Open Patent Publication No. 2008-219007 proposes a system using a ferroelectric recording layer, and recording and reproducing the data using an electric field rather than a magnetic field. According to this proposed system, a voltage simply needs to be applied when recording the data on the magnetic recording medium. In addition, because the data is reproduced using an electric field, the recording and reproducing element can be formed, not by a magnetic material, but by a conductive probe and a coil that generates the magnetic field, and the limit to the recording capability may be increased. However, this proposed system has unstable polarization that locally exists, and slow recording speed, when compared to the conventional magnetic recording system.

Recently, there is active research on materials having both magnetic and ferroelectric properties. Attention is particularly drawn to multiferroic materials having both magnetic and ferroelectric properties. Examples of known multiferroic materials displaying both magnetic ferroelectric properties include $BiFeO_3$, and materials having Bi substituted by Ba, and Fe substituted by Mn. By incorporating such materials in the conventional magnetic recording layer made of the magnetic material, it becomes possible to record data using an electric field, and to reproduce data using a magnetic field, as reported in Yusuke Sugawara et al., "Low-temperature fabrication of $BiFeO_3$ based multiferroic thin films with (111) orientation by sputtering deposition process with VHF plasma irradiation", Proceedings of the 60th Symposium of Applied Physics Society Spring Scientific Presentation, 28a-D3-8, pp. 6-17, 2013, for example.

The recording with respect to the magnetic recording medium using the material having both magnetic and ferroelectric properties can be performed by an electric field.

Hence, by reducing the size of the recording element that generates the electric field, a high recording density can be achieved. On the other hand, the materials displaying both magnetic and ferroelectric properties in many cases take the form of a perovskite structure including oxygen. Such a perovskite structure is a complex structure, and crystallinity plays an important role in developing such properties. In addition, a composition of such a perovskite structure may easily deviate from stoichiometry of the composition and cause oxygen deficiency or the like. Furthermore, according to studies made by the present inventors, when the crystallinity of such materials displaying both magnetic and ferroelectric properties is improved, the size of the crystal grains increase considerably. For this reason, it is difficult to form a smooth medium surface using such materials, and makes the floating of the head unstable. Moreover, structural defects caused by the oxygen deficiency and the increased size of the crystal grains generate magnetic noise when the magnetic head is used to reproduce information from the magnetic recording medium.

SUMMARY OF THE INVENTION

Embodiments of the present invention may provide a perpendicular magnetic recording medium and a magnetic storage apparatus having a reproducing characteristic with a high SNR.

According to one aspect of the embodiment, a perpendicular magnetic recording medium may include a nonmagnetic substrate; an underlayer provided above the nonmagnetic substrate; and a perpendicular recording layer provided above the underlayer, wherein the perpendicular recording layer includes a first magnetic layer including Co and Pt and having a granular structure, and a second magnetic layer having magnetic and ferroelectric properties.

In the perpendicular magnetic recording medium described above, the first magnetic layer may be provided on a side closer to the nonmagnetic substrate than the second magnetic layer.

In the perpendicular magnetic recording medium described above, the second magnetic layer may be made of $(Bi_{1-a}Ba_a)FeO_3$, where "a" is in a range of 0.3 to 0.5.

In the perpendicular magnetic recording medium described above, the second magnetic layer may be made of $Bi(Fe_{1-b}Mn_b)O_3$, where "b" is in a range of 0.3 to 0.8.

In the perpendicular magnetic recording medium described above, the second magnetic layer may be made of $(Bi_{1-a}Ba_a)(Fe_{1-b}Mn_b)O_3$, where "a" is in a range of 0.3 to 0.5, and "b" is in a range of 0.3 to 0.8.

The perpendicular magnetic recording medium described above may further include a nonmagnetic metal layer provided between the first magnetic layer and the second magnetic layer.

In the perpendicular magnetic recording medium described above, the first magnetic layer may include ferromagnetic particles including Pt and Co, and a boundary forming material including at least one material selected from a group of Si oxides, Ti oxides, W oxides, Cr oxides, Co oxides, Ta oxides, B oxides, and Ru oxides.

The perpendicular magnetic recording medium described above may further include a soft magnetic backing layer provided between the nonmagnetic substrate and the underlayer.

According to another aspect of the embodiment, a magnetic storage apparatus may include the perpendicular magnetic recording medium described above; and a head configured to record information on and reproduce information from the perpendicular magnetic recording medium.

Other objects and further features of the present invention will be apparent from the following detailed description when read in conjunction with the accompanying drawings.

DESCRIPTION OF THE PREFERRED EMBODIMENTS

A description will be given of the perpendicular magnetic recording medium and the magnetic storage apparatus in each embodiment of the present invention, by referring to the drawings. The present invention is not limited to the described embodiments, and various variations, modification, and substitutions may be made without departing from the scope of the present invention.

In one embodiment of the present invention, a perpendicular magnetic recording medium includes a nonmagnetic substrate, an underlayer provided above the nonmagnetic substrate, and a perpendicular recording layer provided above the underlayer. The perpendicular recording layer includes a first magnetic layer including at least Co and Pt and having a granular structure, and a second magnetic layer having both magnetic and ferroelectric properties provided above the first magnetic layer. In the following description, the first magnetic layer is also referred to as a "perpendicular magnetic layer" or a "ferromagnetic layer", and the second magnetic layer, which is ferroelectric and magnetic, is also referred to as a "ferroelectric magnetic layer".

As described above, multiferroic materials having both magnetic and ferroelectric properties are known, however, such multiferroic materials in many cases take the form of a perovskite structure having a complex structure. In addition, it is difficult to form a layer from such multiferroic materials, and a composition of the perovskite structure may easily deviate from stoichiometry of the composition and cause oxygen deficiency or the like. Furthermore, according to studies made by the present inventors, structural defects caused by the oxygen deficiency generate magnetic noise when the magnetic head is used to reproduce information from the magnetic recording medium.

In one embodiment of the present invention, a nonmagnetic transition metal layer (hereinafter also referred to as an "antiferromagnetic coupling layer") made of Ru or the like is provided between the ferroelectric magnetic layer and the ferromagnetic layer. By antiferromagnetically coupling the ferroelectric magnetic layer and the ferromagnetic layer, the noise generated from the ferroelectric magnetic layer can be reduced, and the perpendicular magnetic recording medium becomes suited for high-density recording.

In other words, according to the structure in one embodiment of the present invention, when recording information on the ferroelectric magnetic layer by an electric field from a head, a magnetic spin is generated in the ferroelectric magnetic layer, which induces reversal of a magnetic spin in the ferromagnetic layer that is antiferromagnetically coupled to the ferroelectric magnetic layer. As a result, the magnetic spin of the entire perpendicular recording layer is reversed. However, because the ferroelectric magnetic layer and the ferromagnetic layer are antiferromagnetically coupled, the ferroelectric magnetic layer and the ferromagnetic layer form magnetic spins in mutually opposite directions. For this reason, the magnetization of the ferroelectric layer and the magnetization of a part of the ferromagnetic layer cancel each other, such that in the perpendicular magnetic recording medium as a whole, only an output corresponding to a remainder obtained by subtracting the magnetization of the ferroelectric layer from the magnetization of the ferromagnetic layer becomes effective. Accordingly, by employing the structure in one embodiment of the present invention, the noise generated from the ferroelectric magnetic layer can be reduced, and it is possible to provide a perpendicular magnetic recording medium suited for the high-density recording.

Figure 1:
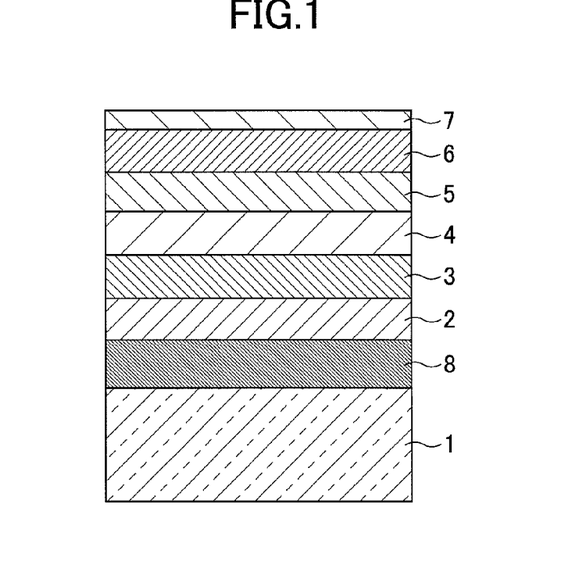
FIG. 1 is a cross sectional view schematically illustrating a configuration of an example of a perpendicular magnetic recording medium in one embodiment.

FIG. 1 is a cross sectional view schematically illustrating a configuration of an example of the perpendicular magnetic recording medium in one embodiment. The perpendicular magnetic recording medium illustrated in FIG. 1 may include a nonmagnetic substrate 1, an underlayer 3, a perpendicular magnetic layer 4, an antiferromagnetic coupling layer 5, a ferroelectric magnetic layer 6, and a protection layer 7 that are stacked in this order. The underlayer 3 controls a perpendicular orientation of the layer provided immediately above the underlayer 3. A bonding layer 8 may be provided between the nonmagnetic substrate 1 and the underlayer 3. In addition, a backing layer 2 may be provided between the nonmagnetic substrate 1 and the underlayer 3, or between the bonding layer 8 and the underlayer 3.

In this embodiment, the nonmagnetic substrate 1 may be formed by an Al alloy substrate made of an Al—Mg alloy or the like having Al as its main component, for example. The nonmagnetic substrate 1 may also be formed by any substrate made of a nonmagnetic material, including substrates made of soda glass, aluminosilicate glass, amorphous glass, silicon, titanium, ceramics, sapphire, quartz, various resins, or the like.

The bonding layer 8 is preferably provided between the nonmagnetic substrate 1 and the underlayer 3. The bonding layer 8 can smoothen the surface of the nonmagnetic substrate 1, and improve bonding between the nonmagnetic substrate 1 and the underlayer 3. In addition, the bonding layer 8 can prevent corrosion of the underlayer 3, which would otherwise be caused by alkali ions from the nonmagnetic substrate 1 diffusing into the underlayer 3. The bonding layer 8 may be made of a nonmagnetic metal material, and preferably has an amorphous structure. The amorphous structure of the bonding layer 8 is dense and can positively prevent diffusion of the alkali ions from the nonmagnetic substrate 11. The amorphous structure of the bonding layer 8 can also maintain a surface roughness Ra low, and enable a floating distance of the head to be reduced. Hence, the amorphous structure of the bonding layer 8 can further increase the high recording density. Materials such as CrTi, NiTa, AlTi alloys, and the like may be used for the bonding layer 8 having the amorphous structure.

The backing layer 2 may be formed prior to forming the underlayer 3. The backing layer 2 can more positively pin the magnetization direction of the perpendicular recording layer in the direction perpendicular to the surface of the nonmagnetic substrate 1, in order to stabilize signals that are reproduced from the perpendicular recording layer by the head. The backing layer 2 may be made of a soft magnetic material. Examples of materials having soft magnetic properties, that may be used for the backing layer 2, may include CoFe alloys (for example, CoFeTaZr, CoFeZrNb, or the like), FeCo alloys (for example, FeCo, FeCoV, or the like), CoZr alloys (for example, CoZr, CoZrNb, or the like), CoTa alloys (for example, CoTa, CoTaZr, or the like), and the like.

The soft magnetic backing layer 2 preferably has an amorphous structure. The amorphous structure of the backing layer 2 can prevent the surface roughness Ra from becoming large, reduce the floating distance of the head, and further increase the high recording density. In addition, the backing layer 2 is not limited to a single-layer structure, and may have a two-layer structure sandwiching an extremely thin nonmagnetic layer made of Ru or the like. In other words, the backing layer 2 preferably has a structure in which two soft magnetic layers are antiferromagnetically coupled via the nonmagnetic layer. A coercivity (Hc) of the backing layer 2 is preferably 100 Oe or lower, and more preferably 20 Oe or lower, where 1 Oe is 79 A/m. When the coercivity (Hc) of the backing layer 2 is higher than the above described range, the soft magnetic property becomes insufficient and undesirable in that the reproduced signal waveform becomes distorted from the so-called square wave waveform.

A saturation magnetic flux density (Bs) of the backing layer 2 is preferably 0.6 T or higher, and more preferably 1 T or higher. When the saturation magnetic flux density (Bs) is lower than the above described range, it is undesirable in that the reproduced signal waveform becomes distorted from the so-called square wave waveform.

In addition, a product (Bs·t) of the saturation magnetic flux density (Bs) of the backing layer 2 and a thickness (t, nm) of the backing layer 2 is preferably 15 Tnm or greater, and more preferably 25 Tnm or greater. When the product (Bs·t) is less than the above described range, it is undesirable in that the reproduced signal waveform becomes distorted from the so-called square wave waveform.

In a state in which no external magnetic field is applied, the magnetization of the backing layer 2 is preferably oriented parallel to the surface of the nonmagnetic substrate 1 and in a radial direction. By restricting the magnetization direction of the backing layer in this manner, it is possible to suppress the so-called spike noise when reproducing signals from the perpendicular magnetic recording medium. Such a structure may be obtained by forming the backing layer 2 from two soft magnetic layers sandwiching a nonmagnetic metal layer, and generating a magnetic coupling (or bias magnetic field $H_{Bias}$) between the two soft magnetic layers.

In this embodiment, the underlayer 3, that controls the orientation of the perpendicular recording layer, is provided on the bonding layer 8. The bonding layer 8 is preferably made of a nonmagnetic material having an hcp (hexagonal close-packed) structure (for example Ru, Re, CoCr alloys, RuCo alloys, or the like), an fcc (face-centered cubic) structure (for example, Ni, Pt, Pd, Ti, Ni alloys (for example, NiNb alloys, NiTa alloys, NiV alloys, NiW alloys, NiPt alloys, NiCr alloys, PtCr alloys, or the like) CoPd alloys, AlTi alloys, or the like), or an amorphous or microcrystal structure (for example, Ta, Hf, Zr, alloys including such elements as their main component, PdSi alloys, CrB alloys, CoB alloys, or the like). In addition, the underlayer 3 preferably has a multi-layer structure in which a layer of Pt, Pt alloy, or the like having an fcc structure, or a layer of Ru, Re, or the like having an hcp structure, is provided on a layer of Ni alloy or the like having an fcc structure. It is particularly preferable that the underlayer 3 has the multi-layer structure and the layer having the hcp structure is provided on the side of the perpendicular recording layer, because the perpendicular orientation and crystallinity of the perpendicular recording layer can be improved.

The underlayer 3 preferably has a thickness in a range of 5 nm to 40 nm. When the underlayer 3 has a thickness falling within this range, the perpendicular orientation of the magnetization of the perpendicular magnetic layer 4 improves, and a resolution of reproduced signals can be improved.

On the other hand, when the thickness of the underlayer 3 is smaller than the above described range, it is undesirable in that the crystal orientation of the perpendicular magnetic layer 4 deteriorates, and an electromagnetic conversion characteristic deteriorates.

Furthermore, when the thickness of the underlayer 3 is larger than the above described range, it is undesirable in that the size of the crystal grains of the perpendicular magnetic layer 4 becomes too large, and the electromagnetic conversion characteristic deteriorates due to an increase of noise and a decrease in resolution of the reproduced signals.

An example of the perpendicular recording layer includes the perpendicular magnetic layer 4 including at least Co and Pt and having a granular structure, and the ferroelectric magnetic layer 6 having both magnetic and ferroelectric properties, are provided above the nonmagnetic substrate 1. The antiferromagnetic coupling layer 5 is provided between the perpendicular magnetic layer 4 and the ferroelectric magnetic layer 6, in order to antiferromagnetically couple the perpendicular magnetic layer 4 and the ferroelectric magnetic layer 6.

In this embodiment, either one of the perpendicular magnetic layer 4 and the ferroelectric magnetic layer 6 may be provided on the side of the nonmagnetic substrate 1. According to the configuration in which the ferroelectric magnetic layer 6 is provided on the side of the nonmagnetic substrate 1, a distance between the perpendicular magnetic layer 4 and the reproducing head becomes small and a large reproduced output can be obtained, to thereby facilitate the high-density recording. On the other hand, according to the configuration in which the perpendicular magnetic layer 4 is provided on the side of the nonmagnetic substrate 1, the crystallinity and orientation of the perpendicular magnetic layer 4 improve due to the effects of the orientation control provided by the underlayer 3, and thus, the electromagnetic conversion characteristic improves. In addition, it is preferable in that a distance between an electric field write element provided on the recording and reproducing head and the ferroelectric magnetic layer 6 becomes small, and the recording with respect to the ferroelectric magnetic layer 6 becomes easy, to thereby facilitate the high-density recording. Particularly in a case in which the perpendicular magnetic layer 4 provided on the side of the nonmagnetic substrate 1 has a structure (so-called granular structure) in which magnetic grains are dispersed within a nonmagnetic material, it is possible to suppress a variance in the grain diameters between the antiferromagnetic coupling layer 5 and the ferroelectric magnetic layer 6 that are provided above the perpendicular magnetic layer 4. As a result, the dielectric properties and the magnetic properties of the ferroelectric magnetic layer 6 improve, thereby making the ferroelectric magnetic layer 6 particularly suited for use in a perpendicular magnetic recording medium that is to achieve a high-density recording.

The ferromagnetic material used for the perpendicular magnetic layer 4 may include Co as its main component and Pt, and may further include other elements, such as Cr, Cu, or the like that are mixed thereto. The material used for the perpendicular magnetic layer 4 preferably orients the axis of easy magnetization in the perpendicular direction. Examples of such a material may include, for example, CoPt alloys, CoPtNi alloys, CoPtFe alloys, CoCrPt alloys, CoCrPtB alloys, CoCrPtCu alloys, CoCrPtNi alloys, and the like. In addition, the perpendicular magnetic layer 4 may be formed by a CoPt multilayer in which a Co layer and a Pt layer are alternately stacked. Furthermore, a structure (for example, CoPtPd stacked layer, CoPtNi stacked layer, CoPtFe stacked layer, CoPtPdNi stacked layer, or the like) in which at least one of a Pd layer, a Ni layer, a Fe layer is repeatedly stacked in addition to the Co layer and the Pt layer, may be employed.

It is particularly preferable that the perpendicular magnetic layer 4 has a structure (that is, granular structure) in which the magnetic grains are dispersed within the nonmagnetic material. An example of a material having such a structure includes a magnetic alloy including CoPt and added with an oxide. The oxide may be at least one kind of oxide selected from a group of Si oxides, Ti oxides, W oxides, Cr oxides, Co oxides, Ta oxide, B oxides, and Ru oxides. Ferromagnetic materials added with such oxides may include, for example, CoCrPt—Si oxides, CoCrPt—Ti oxides, CoCrPt—W oxides, CoCrPt—Cr oxides, CoCrPt—Co oxides, CoCrPt—Ta oxides, CoCrPt—B oxides, CoCrPt—Ru oxides, CoRuPt—Si oxides, CoCrPtRu—Si oxides, and the like. Of course, two or more kinds of such oxides may be added to the ferromagnetic material.

An average grain diameter of the magnetic crystal grains forming the perpendicular magnetic layer 4 is preferably 3 nm or greater and 12 nm or less. An average grain boundary width is preferably 0.3 nm or greater and 2.0 nm or less. The average crystal grain diameter and the average grain boundary width may be calculated using a planar TEM (Transmission Electron Microscopy) monitor image. A total thickness of the magnetic layers included in the perpendicular recording layer is preferably 5 nm to 15 nm.

An oxide-content existing within the perpendicular magnetic layer 4 is preferably 3 mol % to 18 mol % with respect to a mol total amount calculated using compositions other than the oxide as one compound. When the oxide-content is within the above described range, the oxide precipitates around the magnetic grains when the perpendicular magnetic layer 4 is formed, to thereby achieve isolation and size reduction of the magnetic grains.

On the other hand, when the oxide-content exceeds the above described range, the oxide may remain within the magnetic grains or the oxide may precipitate above and below the magnetic grains, and it is undesirable in that the orientation and crystallinity of the perpendicular magnetic layer 4 deteriorate. Further, when the oxide-content is less than the above described range, the isolation and size reduction of the magnetic grains become insufficient, and it is undesirable in that the electromagnetic conversion characteristic deteriorates.

A Pt-content of the perpendicular magnetic layer 4 is preferably 8 at % or greater and 25 at % or less. An electromagnetic conversion characteristic suited for the high-density recording can be obtained when the Pt-content of the perpendicular magnetic layer 4 is within the above described range.

When the Pt-content of the perpendicular magnetic layer 4 is less the above described range, it is undesirable in that the data storage becomes unstable due to heat (that is, heat fluctuation). In addition, when the Pt-content exceeds 25 at %, the crystallinity deteriorates due to stacking fault within the magnetic crystals, and it is undesirable in that the electromagnetic conversion characteristic deteriorates. Particularly in a case in which the magnetic crystals within the perpendicular magnetic layer 4 have the hcp structure, a layer having the fcc structure may be formed within the hcp structure, and it is undesirable in that uniaxial anisotropy may be lost in some cases to deteriorate the electromagnetic conversion characteristic.

The perpendicular magnetic layer 4 may include, in addition to Co and Pt, Cr, Ni, Fe, and the oxide, at least one element selected from a group of B, Ta, Mo, Cu, Nd, W, Nb, Sm, Tb, Ru, and Re. By including at least one such additional element, the size reduction of the magnetic grains can be promoted, or the crystallinity or orientation can be improved, and an electromagnetic conversion characteristic suited for the high-density recording can be obtained.

A total content of at least one such additional element is preferably 8 at % or less. When the total content of at least one such additional element exceeds 8 at %, a crystal structure other than the hcp structure is formed within the magnetic grains, and it is undesirable in that the electromagnetic conversion characteristic deteriorates. The perpendicular magnetic layer 4 may have a multi-layer structure having two or more layers.

In this embodiment, the perpendicular magnetic layer 4 and the ferroelectric magnetic layer 6 are antiferromagnetically coupled. For this reason, it is preferable to provide the antiferromagnetic coupling layer 5 between the perpendicular magnetic layer 4 and the ferroelectric magnetic layer 6 to achieve the antiferromagnetic coupling. A nonmagnetic transition metal material, such as Ru, Re, Cu, Cr, Rh, or the like, may be used for the antiferromagnetic coupling layer 5. A thickness of the antiferromagnetic coupling layer 5 depends on the material used therefor. For example, the thickness of the antiferromagnetic coupling layer 5 that develops the antiferromagnetic coupling may be approximately 0.3 nm for Ru, approximately 0.7 nm for Cr, approximately 0.8 nm for Cu, approximately 0.4 nm for Re, and approximately 0.8 nm for Rh. In addition, the thickness at which the antiferromagnetic coupling is developed has a width of 2 nm to 7 nm from the thicknesses described above. For this reason, the thickness of the antiferromagnetic coupling layer 5 needs to be adjusted depending on the material used therefor, however, the thickness is preferably in a range of 0.2 nm or greater and 1.3 nm or less. When this thickness range of the antiferromagnetic coupling layer 5 is exceeded, the antiferromagnetic coupling energy becomes too weak, and it is undesirable in that maintaining the magnetization directions of the perpendicular magnetic layer 4 and the ferroelectric magnetic layer 6 in mutually opposite directions becomes difficult.

The Ru layer is particularly preferable for use as the antiferromagnetic coupling layer 5. This is because the antiferromagnetic coupling energy of Ru is high compared to that of other materials, and consequently, the magnetic spins are more stable in a state in which the directions of the magnetic spins are in mutually opposite directions between the perpendicular magnetic layer 4 and the ferroelectric magnetic layer 6. When Ru is used for the antiferromagnetic coupling layer 5, the thickness at which the antiferromagnetic coupling is developed is approximately 0.3 nm (first peak) and approximately 1.4 nm (second peak). Utilizing the first peak at approximately 0.3 nm is preferable from the standpoint of controllability and stability.

In this embodiment, the ferroelectric magnetic layer 6 may preferably be made of $(Bi_{1-a}Ba_a)FeO_3$, where "a" is in a range of 0.3 to 0.5. As described above, $BiFeO_3$ is known as a ferroelectric material, however, it is also known that a part of Bi of this material may be substituted by Ba, in order to obtain both ferromagnetic and ferroelectric properties. By setting the substitution rate "a" in this case within the range of 0.3 to 0.5, the suitable material displays both ferromagnetic and ferroelectric properties, and theoretically, the structural stability becomes highest when "a" is set to 0.4. The ferroelectric magnetic layer 6 can be formed by sputtering using targets made of the same material composition, however, it is preferable to use a target with an increased oxygen concentration in order to prevent oxygen deficiency in the layer that is formed.

In this embodiment, the ferroelectric magnetic layer 6 may preferably be made of $Bi(Fe_{1-b}Mn_b)O_3$, where "b" is in a range of 0.3 to 0.8. As described above, $BiFeO_3$ is known as a ferroelectric material, however, it is also known that a part of Fe of this material may be substituted by Mn, in order to obtain both ferromagnetic and ferroelectric properties. By setting the substitution rate "b" in this case within the range of 0.3 to 0.8, the suitable material displays both ferromagnetic and ferroelectric properties, and theoretically, the structural stability becomes highest when "b" is set to 0.5. The ferroelectric magnetic layer 6 can be formed by sputtering using targets made of the same material composition, however, it is preferable to use a target with an increased oxygen concentration in order to prevent oxygen deficiency in the layer that is formed.

In this embodiment, the ferroelectric magnetic layer 6 may preferably be made of $(Bi_{1-a}Ba_a)(Fe_{1-b}Mn_b)O_3$, displaying properties of both the two materials $(Bi_{1-a}Ba_a)$ $FeO_3$ and $Bi(Fe_{1-b}Mn_b)O_3$, where "a" is in a range of 0.3 to 0.5, and "b" is in a range of 0.3 to 0.8. By setting the substitution rate "a" in this case within the range of 0.3 to 0.5, the suitable material displays both ferromagnetic and ferroelectric properties, and theoretically, the structural stability becomes highest when "a" is set to 0.4. By setting the substitution rate "b" in this case within the range of 0.3 to 0.8, the suitable material displays both ferromagnetic and ferroelectric properties, and theoretically, the structural stability becomes highest when "b" is set to 0.5.

In this embodiment, materials such as $MCoO_3$, $MNiO_3$, $MFe_2O_4$, $MCoFeO_3$, $MFeNiO_3$, $MCoMnO_3$, $MNiMnO_3$, or the like may be used for the ferroelectric magnetic layer 6, where M denotes one or more elements selected from a group of rare earth elements, Bi, Y, and alkali-earth elements.

A product (Ms·T) of a saturation magnetization (Ms) of the ferroelectric magnetic layer 6 and a thickness (T) of the ferroelectric magnetic layer 6 is preferably 0.01 memu/cm$^2$ or greater. When this product (Ms·T) is within the above described range, the magnetization of the perpendicular magnetic layer 4 that is magnetically coupled to the ferroelectric magnetic layer 6 via the antiferromagnetic coupling layer 5 can be oriented in a direction opposite to the magnetization of the ferroelectric magnetic layer 6.

The thickness of the ferroelectric magnetic layer 6 is preferably 50 nm or less. When the thickness of the ferroelectric magnetic layer 6 exceeds 50 nm, the crystal grain size within the ferroelectric magnetic layer 6 becomes too large, and the surface roughness of the ferroelectric magnetic layer 6 becomes high. Further, when the ferroelectric magnetic layer 6 having the thickness exceeding 50 nm is provided on the side of the nonmagnetic substrate 1, the crystallinity and orientation of the perpendicular magnetic layer 4 provided above the ferroelectric magnetic layer 6 deteriorate, and the floating distance of the head cannot be made short because of the rough surface shape of the perpendicular magnetic recording medium. As a result, it is undesirable for the thickness of the ferroelectric magnetic layer 6 to exceed 50 nm, because the electromagnetic conversion characteristic deteriorates in this case.

Particularly in a case in which the perpendicular magnetic layer 4 is provided on the side of the nonmagnetic substrate 1, it is further preferable that the upper limit thickness of the ferroelectric magnetic layer 6 is 20 nm or less. Because the distance between the perpendicular magnetic layer 4 and the reproducing element of the head increases by an amount corresponding to the thickness of the ferroelectric magnetic layer 6, the thickness of the ferroelectric magnetic layer 6 is preferably 20 or less in order to prevent deterioration of the reproduced output caused by an increase in the above distance.

The protection layer 7 protects the perpendicular magnetic recording medium from becoming damaged due to contact between the head and the perpendicular magnetic recording medium. The protection layer 7 may be made of carbon. The protection layer 7 may be formed by sputtering, plasma CVD (Chemical Vapor Deposition), ion beam deposition, or the like. Recently, ion beam deposition is often used to form the protection layer 7. The thickness of the protection layer 7 is approximately 1 nm to approximately 10 nm, for example.

Figure 2:
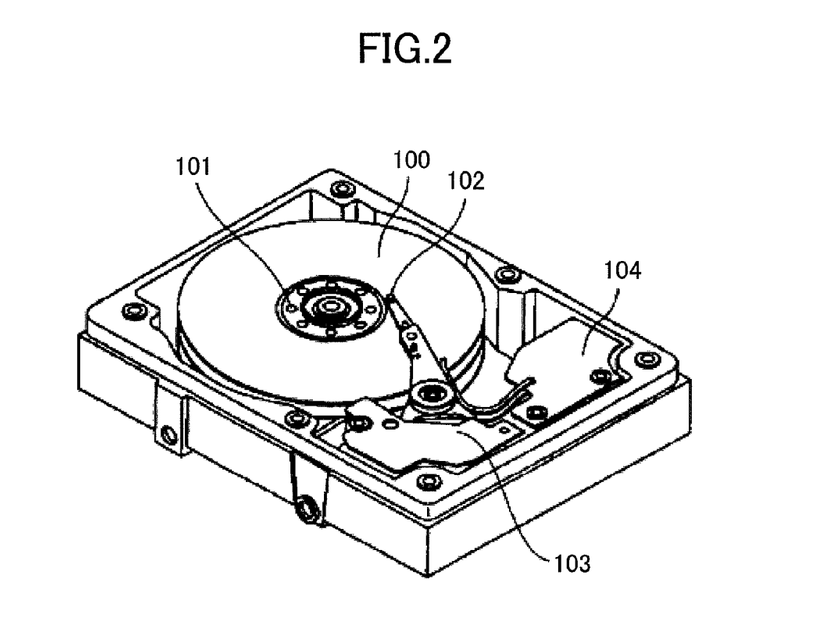
FIG. 2 is a perspective view schematically illustrating an example of a magnetic storage apparatus in one embodiment of the present invention.

FIG. 2 is a perspective view schematically illustrating an example of a magnetic storage apparatus in one embodiment of the present invention. The magnetic storage apparatus (or magnetic recording and reproducing apparatus) illustrated in FIG. 2 includes a perpendicular magnetic recording medium 100 having the same configuration as the perpendicular magnetic recording medium illustrated in FIG. 1, a medium drive part 101 to rotationally drive the perpendicular magnetic recording medium 100, a recording and reproducing head 102 to record information on and reproduce information from the perpendicular magnetic recording medium 100, a head drive part 103 to drive and move the recording and reproducing head 102 relative to the perpendicular magnetic recording medium 100, and a signal processing system 104.

The signal processing system 104 processes external data input to the magnetic storage apparatus, and sends recording signals to the recording and reproducing head 102. The signal processing system 104 also processes reproduced signals that are reproduced from the perpendicular magnetic recording medium 100 by the recording and reproducing head 102, into data having a format suited for processing in an external apparatus, for example. The data output from the signal processing system 104, obtained by processing the reproduced signals, may be output from the magnetic storage apparatus to the external apparatus, for example.

The recording and reproducing head 102 used in the magnetic storage apparatus in one embodiment includes a recording element and a reproducing element that are provided separately. The recording element may be formed by an electric field write element using a probe electrode, for example. On the other hand, the reproducing element may be formed by a GMR element utilizing the GMR effect, a TuMR element utilizing the tunneling effect, or the like.

PRACTICAL EXAMPLES

Next, a description will be given of practical examples. However, the present invention is not limited to these practical examples, and various variations, modifications, and substitutions may be made without departing from the scope of the present invention.

Practical Example Emb1

Next, a description will be given of a practical example Emb1 in which a perpendicular magnetic recording medium is fabricated by the following fabrication method and evaluated. First, a cleaned glass substrate (manufactured by Konica Minolta, Inc. and having an outer diameter of 65 mm (or 2.5 inches), an inner diameter of 20 mm, and an average surface roughness (Ra) of 0.2 nm) is placed within a deposition chamber of a DC (Direct Current) magnetron sputtering apparatus (C-3040 manufactured by Canon Anelva Corporation). After evacuating the inside of the deposition chamber until a vacuum of $1 \times 10^{-5}$ Pa is reached, Ar gas is introduced so that the inside of the deposition chamber becomes 0.8 Pa. Then, a bonding layer having a thickness of 200 nm is formed on this glass substrate using a 50Cr-50Ti {Cr-content 50 at %-Ti-content 50 at %} target.

Next, a layer of 95Ni-5W {Ni-content 95 at %, W-content 5 at %} having a thickness of 5 nm, an Ru layer having a thickness of 10 nm, and an Ru layer having a thickness of 10 nm are successively stacked as an underlayer, where the pressure within the deposition chamber is set to 8.0 Pa when forming the latter Ru layer. Then, Ar gas is adjusted to make the pressure within the deposition chamber 0.8 Pa, and a layer of (Co-13Cr-16Pt) 88 mol %-(SiO$_2$) 12 mol % {Cr-content 13 at %, Pt-content 16 at %, remainder alloy of Co 88 mol %, oxide made of SiO$_2$ 12 mol %} having a thickness of 15 nm is formed as a ferromagnetic layer.

Next, an Ru layer having a thickness of 0.3 nm is formed as an antiferromagnetic coupling layer. Thereafter, a ferroelectric magnetic layer having a thickness of 10 nm is formed by RF (Radio Frequency) sputtering using a $(Bi_{0.6}Ba_{0.4})FeO_3$ target.

Next, a DLC (Diamond-Like Carbon) layer having a thickness of 3 nm is formed as a protection layer, and a lubricant layer having a thickness of 2 nm is coated thereon to form the perpendicular magnetic recording medium.

When a voltage versus polarization curve is measured as the dielectric characteristic of the perpendicular magnetic recording medium that is fabricated by the above described process, a saturation polarization of 50 µC/cm$^2$ is obtained. In addition, the product (Ms·T) of the saturation magnetization (Ms) of the ferroelectric magnetic layer 6 and the thickness (T) of the ferroelectric magnetic layer 6 is obtained by dividing the saturation magnetization (Ms), obtained by calculating (Ms–Mr)/2 from the saturation magnetization (Ms) and a remanent magnetization (Mr) that are obtained by a VSM (Vibrating Sample Magnetometer) measurement in a direction perpendicular to the substrate surface of the perpendicular magnetic recording medium, by an area of the sample.

Next, the perpendicular magnetic recording medium is placed on a spin stand manufactured by Guzik Technical Enterprises, and the electromagnetic conversion characteristic is measured under conditions of a measuring radius of 21 mm, a rotational speed of 5400 rpm, a maximum signal frequency of 514.02 MHz (linear recording density of 2139 kbits per inch), and a write voltage of 1.5 V. The head used for the measurement includes a recording element having an electrode probe with a tip diameter of 10 nm, and a reproducing element having a TuMR thin film. When recording the data, a data sequence is converted into electrical polarities, and a voltage is applied from the electrode probe. On the other hand, when reproducing the data, magnetic changes in accordance with the data sequence are detected by the TuMR element. As a result, an SNR of 16.9 dB and a BER (Bit Error Rate) of $1 \times 10^{-7.3}$ are obtained.

Practical Examples Emb2 through Emb5

In practical examples Emb2 through Emb5, the perpendicular magnetic recording medium is fabricated in a manner similar to the practical example Emb1 described above, except that the thicknesses of the ferroelectric magnetic layer in the practical examples Emb2 through Emb5 are different from that of the practical example Emb1, as illustrated in Table 1. Characteristics of the practical examples Emb2 through Emb5 are evaluated in the same manner as the practical example Emb1, and are also illustrated in Table 1.

TABLE 1

| | MAGNETIC LAYER STRUCTURE SUBSTRATE SIDE/PROTECTION LAYER SIDE | FERROELECTRIC MAGNETIC LAYER | | | ELECTROMAGNETIC CONVERSION CHARACTERISTIC | |
|---|---|---|---|---|---|---|
| | | SATURATION POLARIZATION | MsT [memu/cm$^2$] | THICKNESS | SNR | BER (1 × 10$^x$) |
| Emb1 | (Co13Cr16Pt)88-(SiO$_2$)12/Ru/(Bi$_{0.6}$Ba$_{0.4}$)FeO$_3$ | 50 | 0.02 | 10 | 16.9 | −7.3 |
| Emb2 | (Co13Cr16Pt)88-(SiO$_2$)12/Ru/(Bi$_{0.6}$Ba$_{0.4}$)FeO$_3$ | 50 | 0.04 | 20 | 16.6 | −6.4 |
| Emb3 | (Co13Cr16Pt)88-(SiO$_2$)12/Ru/(Bi$_{0.6}$Ba$_{0.4}$)FeO$_3$ | 50 | 0.014 | 7 | 16.6 | −6.5 |
| Emb4 | (Co13Cr16Pt)88-(SiO$_2$)12/Ru/(Bi$_{0.6}$Ba$_{0.4}$)FeO$_3$ | 50 | 0.01 | 5 | 15.8 | −5.9 |
| Emb5 | (Co13Cr16Pt)88-(SiO$_2$)12/Ru/(Bi$_{0.6}$Ba$_{0.4}$)FeO$_3$ | 50 | 0.044 | 22 | 16.2 | −5.9 |
| Emb6 | (Bi$_{0.6}$Ba$_{0.4}$)FeO$_3$/Ru/(Co13Cr16Pt)88-(SiO$_2$)12 | 50 | 0.02 | 10 | 17.3 | −7.7 |
| Emb7 | (Bi$_{0.6}$Ba$_{0.4}$)FeO$_3$/Ru/(Co13Cr16Pt)88-(SiO$_2$)12 | 50 | 0.04 | 20 | 16.8 | −7.3 |
| Emb8 | (Bi$_{0.6}$Ba$_{0.4}$)FeO$_3$/Ru/(Co13Cr16Pt)88-(SiO$_2$)12 | 50 | 0.1 | 50 | 15.1 | −5.4 |
| Emb9 | (Bi$_{0.6}$Ba$_{0.4}$)FeO$_3$/Ru/(Co13Cr16Pt)88-(SiO$_2$)12 | 50 | 0.108 | 54 | 14.8 | −5.1 |
| Cmp1 | (Co13Cr16Pt)88-(SiO$_2$)12/Bi$_{0.6}$Ba$_{0.4}$FeO$_3$ | 50 | 0.02 | 10 | 11.1 | −3.3 |
| Cmp2 | (Bi$_{0.6}$Ba$_{0.4}$)FeO$_3$/(Co13Cr16Pt)88-(SiO$_2$)12 | 50 | 0.02 | 10 | 11.3 | −3.5 |
| Cmp3 | (Co13Cr16Pt)88-(SiO$_2$)12 | — | — | — | EVALUATION DIFFICULT | EVALUATION DIFFICULT |

Practical Examples Emb6 through Emb9

In practical examples Emb6 through Emb9, the perpendicular magnetic recording medium is fabricated in a manner similar to the practical example Emb1 described above, except that the perpendicular recording layer is formed in the following manner. That is, a ferroelectric magnetic layer having a thickness of 10 nm is formed by RF sputtering using a (Bi$_{0.6}$Ba$_{0.4}$)FeO$_3$ target.

Thereafter, an Ru layer having a thickness of 0.3 nm is formed as an antiferromagnetic coupling layer, and a layer of (Co-13Cr-16Pt) 88 mol %-(SiO$_2$) 12 mol % {Cr-content 13 at %, Pt-content 16 at %, remainder alloy of Co 88 mol %, oxide made of SiO$_2$ 12 mol %} having a thickness of 15 nm is stacked thereon as a ferromagnetic layer.

Next, a DLC layer having a thickness of 3 nm is formed by ion beam deposition as a protection layer, and a lubricant layer having a thickness of 2 nm is coated thereon to form the perpendicular magnetic recording medium.

Characteristics of the practical examples Emb6 through Emb9 are evaluated in the same manner as the practical example Emb1, and are also illustrated in Table 1.

Practical Examples Emb10 Through Emb20

In practical examples Emb10 through Emb20, the perpendicular magnetic recording medium is fabricated in a manner similar to the practical example Emb1 described above, except that the bonding layer 8 is made of 50Al-50Ti {Al-content 50 at %, Ti-content 50 at %} and has a thickness of 100 nm, and materials and thicknesses for the antiferromagnetic coupling layer 5 are as illustrated in Table 2.

TABLE 2

| | MAGNETIC LAYER STRUCTURE SUBSTRATE SIDE/ PROTECTION LAYER SIDE | ANTIFERRO-MAGNETIC COUPLING LAYER | | ELECTROMAGNETIC CONVERSION CHARACTERISTIC | | MAGNETIC COUPLING |
|---|---|---|---|---|---|---|
| | | MATERIAL | THICKNESS | SNR | BER (1 × 10$^x$) | |
| Emb10 | (Co13Cr16Pt)88-(SiO$_2$)12/Ru/(Bi$_{0.6}$Ba$_{0.4}$)FeO$_3$ | Ru | 0.2 | 16.5 | −7 | ANTIFERRO-MAGNETIC |
| Emb11 | (Co13Cr16Pt)88-(SiO$_2$)12/Ru/(Bi$_{0.6}$Ba$_{0.4}$)FeO$_3$ | Ru | 0.3 | 16.9 | −7.3 | ANTIFERRO-MAGNETIC |
| Emb12 | (Co13Cr16Pt)88-(SiO$_2$)12/Ru/(Bi$_{0.6}$Ba$_{0.4}$)FeO$_3$ | Ru | 0.4 | 16.4 | −7 | ANTIFERRO-MAGNETIC |
| Emb13 | (Co13Cr16Pt)88-(SiO$_2$)12/Re/(Bi$_{0.6}$Ba$_{0.4}$)FeO$_3$ | Re | 0.4 | 16.4 | −6.8 | ANTIFERRO-MAGNETIC |
| Emb14 | (Co13Cr16Pt)88-(SiO$_2$)12/Rh/(Bi$_{0.6}$Ba$_{0.4}$)FeO$_3$ | Rh | 0.8 | 16.7 | −6.9 | ANTIFERRO-MAGNETIC |
| Emb15 | (Co13Cr16Pt)88-(SiO$_2$)12/Cu/(Bi$_{0.6}$Ba$_{0.4}$)FeO$_3$ | Cu | 0.8 | 15.8 | −5.7 | ANTIFERRO-MAGNETIC |
| Emb16 | (Co13Cr16Pt)88-(SiO$_2$)12/Nb/(Bi$_{0.6}$Ba$_{0.4}$)FeO$_3$ | Nb | 1 | 16 | −6.1 | ANTIFERRO-MAGNETIC |
| Emb17 | (Co13Cr16Pt)88-(SiO$_2$)12/Mo/(Bi$_{0.6}$Ba$_{0.4}$)FeO$_3$ | Mo | 0.5 | 15.6 | −5.6 | ANTIFERRO-MAGNETIC |
| Emb18 | (Co13Cr16Pt)88-(SiO$_2$)12/W/(Bi$_{0.6}$Ba$_{0.4}$)FeO$_3$ | W | 0.6 | 16 | −6 | ANTIFERRO-MAGNETIC |
| Emb19 | (Co13Cr16Pt)88-(SiO$_2$)12/Ta/(Bi$_{0.6}$Ba$_{0.4}$)FeO$_3$ | Ta | 0.6 | 15.9 | −5.8 | ANTIFERRO-MAGNETIC |
| Emb20 | (Co13Cr16Pt)88-(SiO$_2$)12/Cr/(Bi$_{0.6}$Ba$_{0.4}$)FeO$_3$ | Cr | 0.8 | 15.7 | −5.8 | ANTIFERRO-MAGNETIC |
| Cmp4 | (Co13Cr16Pt)88-(SiO$_2$)12/Ru/(Bi$_{0.6}$Ba$_{0.4}$)FeO$_3$ | Ru | 1 | 13.1 | −4.5 | FERROMAGNETIC |
| Cmp5 | (Co13Cr16Pt)88-(SiO$_2$)12/Ru/(Bi$_{0.6}$Ba$_{0.4}$)FeO$_3$ | Ru | 5 | 12.9 | −4.3 | FERROMAGNETIC |

TABLE 2-continued

| MAGNETIC LAYER STRUCTURE SUBSTRATE SIDE/ PROTECTION LAYER SIDE | ANTIFERRO-MAGNETIC COUPLING LAYER | | ELECTROMAGNETIC CONVERSION CHARACTERISTIC | | MAGNETIC COUPLING |
|---|---|---|---|---|---|
| | MATE-RIAL | THICK-NESS | SNR | BER ($1 \times 10^x$) | |
| Cmp6 $(Co13Cr16Pt)88-(SiO_2)12/Ti/(Bi_{0.6}Ba_{0.4})FeO_3$ | Ti | 0.6 | 12.8 | −4.3 | FERROMAGNETIC |
| Cmp7 $(Co13Cr16Pt)88-(SiO_2)12/Zr/(Bi_{0.6}Ba_{0.4})FeO_3$ | Zr | 0.6 | 12.7 | −4.2 | FERROMAGNETIC |
| Cmp8 $(Co13Cr16Pt)88-(SiO_2)12/Hf/(Bi_{0.6}Ba_{0.4})FeO_3$ | Hf | 0.6 | 12.9 | −4.3 | FERROMAGNETIC |

The perpendicular magnetic recording medium of each of the practical examples Emb10 through Emb20 is placed on the spin stand manufactured by Guzik Technical Enterprises, and the electromagnetic conversion characteristic is measured under the conditions of the measuring radius of 21 mm, the rotational speed of 5400 rpm, the maximum signal frequency of 514.02 MHz (linear recording density of 2139 kbits per inch), and the write voltage of 1.5 V. The head used for the measurement includes the recording element having the electrode probe with the tip diameter of 10 nm, and the reproducing element having the TuMR thin film. When recording the data, the data sequence is converted into electrical polarities, and the voltage is applied from the electrode probe. On the other hand, when reproducing the data, the magnetic changes in accordance with the data sequence are detected by the TuMR element. The evaluation results of the practical examples Emb10 through Emb20 are illustrated in Table 2.

Practical Examples Emb21 through Emb35

In practical examples Emb21 through Emb35, the perpendicular magnetic recording medium is fabricated in a manner similar to the practical example Emb1 described above, except that materials illustrated in Table 3 are used for the ferroelectric magnetic layer 6.

TABLE 3

| | FERROELECTRIC MAGNETIC LAYER | | ELECTROMAGNETIC CONVERSION CHARACTERISTIC | |
|---|---|---|---|---|
| | MATERIAL | MsT [memu/cm$^2$] | SNR | BER ($1 \times 10^x$) |
| Emb21 | $(Bi_{0.5}Ba_{0.5})FeO_3$ | 0.021 | 16.5 | −7 |
| Emb22 | $(Bi_{0.3}Ba_{0.7})FeO_3$ | 0.022 | 16.4 | −7.1 |
| Emb23 | $(Bi_{0.2}Ba_{0.8})FeO_3$ | 0.023 | 16.1 | −6.7 |
| Emb24 | $(Bi_{0.8}Ba_{0.2})FeO_3$ | 0.016 | 16 | −6.6 |
| Emb25 | $BaFeO_3$ | 0.025 | 15.8 | −6.5 |
| Emb26 | $BiFeO_3$ | 0.015 | 15.7 | −6.5 |
| Emb27 | $Bi(Fe_{0.3}Mn_{0.7})O_3$ | 0.01 | 15.9 | −6.3 |
| Emb28 | $Bi(Fe_{0.5}Mn_{0.5})O_3$ | 0.012 | 16.8 | −7.2 |
| Emb29 | $Bi(Fe_{0.8}Mn_{0.2})O_3$ | 0.014 | 16.1 | −6.7 |
| Emb30 | $BiMnO_3$ | 0.005 | 15.4 | −5.9 |
| Emb31 | $(Bi_{0.6}Ba_{0.4})(Fe_{0.6}Mn_{0.4})O_3$ | 0.018 | 17.2 | −7.6 |
| Emb32 | $PrFeO_3$ | 0.017 | 15.9 | −6.4 |
| Emb33 | $BiCoO_3$ | 0.014 | 16.2 | −6.5 |
| Emb34 | $Gd(Ni_{0.3}Mn_{0.7})O_3$ | 0.007 | 15.5 | −6 |
| Emb35 | $Tb(Fe_{0.5}Ni_{0.3}Mn_{0.2})O_3$ | 0.018 | 16.1 | −6.4 |

The product (Ms·T) of the saturation magnetization (Ms) of the ferroelectric magnetic layer 6 and the thickness (T) of the ferroelectric magnetic layer 6 is obtained, for the perpendicular magnetic recording medium of each of the practical examples Emb21 through Emb35, by dividing the saturation magnetization (Ms), obtained by calculating (Ms−Mr)/2 from the saturation magnetization (Ms) and the remanent magnetization (Mr) that are obtained by the VSM measurement in the direction perpendicular to the substrate surface of the perpendicular magnetic recording medium, by an area of the sample.

The perpendicular magnetic recording medium of each of the practical examples Emb21 through Emb35 is placed on the spin stand manufactured by Guzik Technical Enterprises, and the electromagnetic conversion characteristic is measured under the conditions of the measuring radius of 21 mm, the rotational speed of 5400 rpm, the maximum signal frequency of 514.02 MHz (linear recording density of 2139 kbits per inch), and the write voltage of 1.5 V. The head used for the measurement includes the recording element having the electrode probe with the tip diameter of 10 nm, and the reproducing element having the TuMR thin film. When recording the data, the data sequence is converted into electrical polarities, and the voltage is applied from the electrode probe. On the other hand, when reproducing the data, the magnetic changes in accordance with the data sequence are detected by the TuMR element. The evaluation results of the practical examples Emb21 through Emb35 are illustrated in Table 3.

Practical Example Emb36

Next, a description will be given of a practical example Emb36 in which a perpendicular magnetic recording medium is fabricated by the following fabrication method and evaluated. First, a cleaned glass substrate (manufactured by Konica Minolta, Inc. and having an outer diameter of 65 mm (or 2.5 inches), an inner diameter of 20 mm, and an average surface roughness (Ra) of 0.2 nm) is placed within the deposition chamber of the DC magnetron sputtering apparatus (C-3040 manufactured by Canon Anelva Corporation). After evacuating the inside of the deposition chamber until a vacuum of $1 \times 10^{-5}$ Pa is reached, Ar gas is introduced so that the inside of the deposition chamber becomes 0.8 Pa. Then, a bonding layer having a thickness of 200 nm is formed on this glass substrate using a 50Cr-50Ti {Cr-content 50 at %-Ti-content 50 at %} target.

Next, a backing layer having a thickness of 100 nm is formed by DC (Direct Current) sputtering using a Co-27Fe-5Zr-3Ta-1Al-1Cr {Fe-content 27 at %, Zr-content 5 at %, Ta-content 3 at %, Al-content 1 at %, Cr-content 1 at %, remainder Co}. At this stage, a product (Bs·t) of the saturation magnetic flux density (Bs) of the backing layer and the thickness (t) of the backing layer, measured using the VSM, is 120 Tnm.

Next, a layer of 95Ni-5W {Ni-content 95 at %, W-content 5 at %} having a thickness of 5 nm, an Ru layer having a thickness of 10 nm, and an Ru layer having a thickness of 10 nm are successively stacked as an underlayer, where the pressure within the deposition chamber is set to 8.0 Pa when forming the latter Ru layer. Then, Ar gas is adjusted to make the pressure within the deposition chamber 0.8 Pa, and a ferromagnetic layer having a thickness of 15 nm is formed by stacking a layer of (Co-13Cr-16Pt) 88 mol %-(SiO$_2$) 12 mol % {Cr-content 13 at %, Pt-content 16 at %, remainder alloy of Co 88 mol %, oxide made of SiO$_2$ 12 mol %}.

Next, an Ru layer having a thickness of 0.3 nm is formed as an antiferromagnetic coupling layer. Thereafter, a ferroelectric magnetic layer having a thickness of 10 nm is formed by RF sputtering using a (Bi$_{0.6}$Ba$_{0.4}$)FeO$_3$ target. Next, a DLC (Diamond-Like Carbon) layer having a thickness of 3 nm is formed as a protection layer, and a lubricant layer having a thickness of 2 nm is coated thereon to form the perpendicular magnetic recording medium.

Next, the perpendicular magnetic recording medium is placed on the spin stand manufactured by Guzik Technical Enterprises, and the electromagnetic conversion characteristic is measured under conditions of a measuring radius of 21 mm, the rotational speed of 5400 rpm, the maximum signal frequency of 514.02 MHz (linear recording density of 2139 kbits per inch), and the write voltage of 1.5 V. The head used for the measurement includes the recording element having the electrode probe with the tip diameter of 10 nm, and the reproducing element having the TuMR thin film. When recording the data, the data sequence is converted into electrical polarities, and the voltage is applied from the electrode probe. On the other hand, when reproducing the data, the magnetic changes in accordance with the data sequence are detected by the TuMR element. The evaluation results of the practical example Emb36 are illustrated in Table 4.

roughness (Ra) of 0.2 nm) is placed within the deposition chamber of the DC magnetron sputtering apparatus (C-3040 manufactured by Canon Anelva Corporation). After evacuating the inside of the deposition chamber until a vacuum of $1 \times 10^{-5}$ Pa is reached, Ar gas is introduced so that the inside of the deposition chamber becomes 0.8 Pa. Then, a bonding layer having a thickness of 200 nm is formed on this glass substrate using a 50Cr-50Ti {Cr-content 50 at %-Ti-content 50 at %} target.

Next, a backing layer is formed by DC (Direct Current) sputtering, by stacking a layer of Co-30Fe-3Ta-5Zr {Fe-content 30 at %, Ta-content 3 at %, Zr-content 5 at %, remainder Co} having a thickness of 40 nm, an Ru layer having a thickness of 0.4 nm, and a layer of Co-30Fe-3Ta-5Zr {Fe-content 30 at %, Ta-content 3 at %, Zr-content 5 at %, remainder Co} having a thickness of 40 nm. At this stage, the product (Bs·t) of the saturation magnetic flux density (Bs) of the backing layer and the thickness (t) of the backing layer, measured using the VSM, is 140 Tnm.

Next, a layer of 95Ni-5W {Ni-content 95 at %, W-content 5 at %} having a thickness of 5 nm, an Ru layer having a thickness of 10 nm, and an Ru layer having a thickness of 10 nm are successively stacked as an underlayer, where the pressure within the deposition chamber is set to 8.0 Pa when forming the latter Ru layer. Then, Ar gas is adjusted to make the pressure within the deposition chamber 0.8 Pa, and a ferromagnetic layer having a thickness of 15 nm is formed by stacking a layer of (Co-13Cr-16Pt) 88 mol %-(SiO$_2$) 12 mol % {Cr-content 13 at %, Pt-content 16 at %, remainder alloy of Co 88 mol %, oxide made of SiO$_2$ 12 mol %}.

Next, an Ru layer having a thickness of 0.3 nm is formed as an antiferromagnetic coupling layer. Thereafter, a ferroelectric magnetic layer having a thickness of 10 nm is formed by RF sputtering using a (Bi$_{0.6}$Ba$_{0.4}$)FeO$_3$ target.

TABLE 4

| | BACKING LAYER | | ELECTROMAGNETIC CONVERSION CHARACTERISTIC | |
|---|---|---|---|---|
| STRUCTURE | THICKNESS MATERIAL | BsT [Tnm] | SNR | BER ($1 \times 10^x$) |
| Emb1 | — | — | — | 16.9 | −7.3 |
| Emb36 | Co27Fe5Zr3Ta1Al1Cr | 100 | 120 | 17.2 | −6.8 |
| Emb37 | Fe30Co3Ta5Zr | 80 | 140 | 17.1 | −6.9 |
| Emb38 | Fe30Co3Ta5Zr/Ru/Fe30Co3Ta5Zr | 40/0.4/40 | 140 | 17.3 | −7.6 |
| Emb39 | Co10Ta5Zr/Ru/Co10Ta5Zr | 40/0.4/40 | 110 | 17.2 | −7.4 |
| Emb40 | Co30Fe/Ru/Co30Fe | 30/0.4/30 | 100 | 17 | −7.4 |

Practical Example Emb37

In practical example Emb37, the perpendicular magnetic recording medium is fabricated in a manner similar to the practical example Emb36 described above, except that the materials illustrated in Table 4 are used for the backing layer. The evaluation results of the practical example Emb36 are illustrated in Table 4.

Practical Example Emb38

Next, a description will be given of a practical example Emb38 in which a perpendicular magnetic recording medium is fabricated by the following fabrication method and evaluated. First, a cleaned glass substrate (manufactured by Konica Minolta, Inc. and having an outer diameter of 65 mm (or 2.5 inches), an inner diameter of 20 mm, and an average surface Next, a DLC layer having a thickness of 3 nm is formed as a protection layer, and a lubricant layer having a thickness of 2 nm is coated thereon to form the perpendicular magnetic recording medium.

Next, the perpendicular magnetic recording medium is placed on the spin stand manufactured by Guzik Technical Enterprises, and the electromagnetic conversion characteristic is measured under conditions of a measuring radius of 21 mm, the rotational speed of 5400 rpm, the maximum signal frequency of 514.02 MHz (linear recording density of 2139 kbits per inch), and the write voltage of 1.5 V. The head used for the measurement includes the recording element having the electrode probe with the tip diameter of 10 nm, and the reproducing element having the TuMR thin film. When recording the data, the data sequence is converted into electrical polarities, and the voltage is applied from the electrode probe. On the other hand, when reproducing the data, the magnetic changes in accordance with the data sequence are detected by the TuMR element. The evaluation results of the practical example Emb38 are illustrated in Table 4.

Practical Examples Emb39 and Emb40

In practical examples Emb39 and Emb40, the perpendicular magnetic recording medium is fabricated in a manner similar to the practical example Emb38 described above, except that the materials illustrated in Table 4 are used for the backing layer.

The magnetic characteristics of the practical examples Emb39 and Emb40 are evaluated in the same manner as the practical example Emb36 described above. The evaluation results of the practical examples Emb39 and Emb40 are illustrated in Table 4.

Practical Examples Emb41 through Emb45

In practical examples Emb41 through Emb45, the perpendicular magnetic recording medium is fabricated in a manner similar to the practical example Emb36 described above, except that the materials illustrated in Table 5 are used for the perpendicular magnetic layer 4. Next, the perpendicular magnetic recording medium is placed on the spin stand manufactured by Guzik Technical Enterprises, and the electromagnetic conversion characteristic is measured under conditions of a measuring radius of 21 mm, the rotational speed of 5400 rpm, the maximum signal frequency of 514.02 MHz (linear recording density of 2139 kbits per inch), and the write voltage of 1.5 V. The head used for the measurement includes the recording element having the electrode probe with the tip diameter of 10 nm, and the reproducing element having the TuMR thin film. When recording the data, the data sequence is converted into electrical polarities, and the voltage is applied from the electrode probe. On the other hand, when reproducing the data, the magnetic changes in accordance with the data sequence are detected by the TuMR element. The evaluation results of the practical examples Emb41 through Emb45 are illustrated in the Table 5.

target. According to this layer structure of the perpendicular recording layer, the ferromagnetic layer and the ferroelectric magnetic layer are not antiferromagnetically coupled, but are ferromagnetically coupled.

When a voltage versus polarization curve is measured as the dielectric characteristic of the perpendicular magnetic recording medium that is fabricated by the above described process, a saturation polarization of 50 $\mu C/cm^2$ is obtained. In addition, the product (Ms·T) of the saturation magnetization (Ms) of the ferroelectric magnetic layer 6 and the thickness (T) of the ferroelectric magnetic layer 6 is obtained by dividing the saturation magnetization (Ms), obtained by calculating (Ms−Mr)/2 from the saturation magnetization (Ms) and a remanent magnetization (Mr) that are obtained by a VSM measurement in a direction perpendicular to the substrate surface of the perpendicular magnetic recording medium, by an area of the sample.

Next, the perpendicular magnetic recording medium is placed on the spin stand manufactured by Guzik Technical Enterprises, and the electromagnetic conversion characteristic is measured under the conditions of the measuring radius of 21 mm, the rotational speed of 5400 rpm, the maximum signal frequency of 514.02 MHz (linear recording density of 2139 kbits per inch), and the write voltage of 1.5 V. The head used for the measurement includes the recording element having the electrode probe with the tip diameter of 10 nm, and the reproducing element having the TuMR thin film. When recording the data, the data sequence is converted into electrical polarities, and the voltage is applied from the electrode probe. On the other hand, when reproducing the data, the magnetic changes in accordance with the data sequence are detected by the TuMR element. As a result, an SNR of 11.1 dB and a BER (Bit Error Rate) of $1\times10^{-3.3}$ are obtained, as illustrated in Table 1.

Comparison Example Cmp2

In a comparison example Cmp2, the perpendicular magnetic recording medium is fabricated in a manner similar to

TABLE 5

|  | MAGNETIC LAYER STRUCTURE SUBSTRATE SIDE/PROTECTION LAYER SIDE | ELECTROMAGNETIC CONVERSION CHARACTERISTIC | |
| --- | --- | --- | --- |
|  |  | SNR | BER ($1 \times 10^x$) |
| Emb1 | (Co13Cr16Pt)88—(SiO$_2$)12/Ru/(Bi$_{0.6}$Ba$_{0.4}$)FeO$_3$ | 16.9 | −7.3 |
| Emb41 | (Co13Cr16Pt)92—(Cr$_2$O$_3$)8/Ru/(Bi$_{0.6}$Ba$_{0.4}$)FeO$_3$ | 17 | −7.3 |
| Emb42 | (Co12Cr14Pt)90—(TiO$_2$)10/Ru/(Bi$_{0.6}$Ba$_{0.4}$)FeO$_3$ | 16.8 | −7.1 |
| Emb43 | (Co10Cr18Pt)94—(CoO)6/Ru/(Bi$_{0.6}$Ba$_{0.4}$)FeO$_3$ | 16.9 | −7.2 |
| Emb44 | (Co10Cr18Pt)90—(CoO)6—(Cr$_2$O$_3$)4/Ru/(Bi$_{0.6}$Ba$_{0.4}$)FeO$_3$ | 17.3 | −7.5 |
| Emb45 | Co10Cr20Pt4B/Ru/(Bi$_{0.6}$Ba$_{0.4}$)FeO$_3$ | 15.4 | −5.7 |

Comparison Example Cmp

In a comparison example Cmp1, the perpendicular magnetic recording medium is fabricated in a manner similar to the practical example Emb1 described above, except that the perpendicular recording layer is formed as follows. That is, a layer of (Co-13Cr-16Pt) 88 mol %-(SiO$_2$) 12 mol % {Cr-content 13 at %, Pt-content 16 at %, remainder alloy of Co 88 mol %, oxide made of SiO$_2$ 12 mol %} having a thickness of 10 nm is formed as a ferromagnetic layer.

Next, a ferroelectric magnetic layer having a thickness of 3 nm is formed by RF sputtering using a (Bi$_{0.6}$Ba$_{0.4}$)FeO$_3$ the comparison example Cmp1 described above, except that the perpendicular recording layer is formed as follows. That is, a ferroelectric magnetic layer having a thickness of 10 nm is formed by RF sputtering using a (Bi$_{0.6}$Ba$_{0.4}$)FeO$_3$ target.

Next, a layer of (Co-13Cr-16Pt) 88 mol %-(SiO$_2$) 12 mol % {Cr-content 13 at %, Pt-content 16 at %, remainder alloy of Co 88 mol %, oxide made of SiO$_2$ 12 mol %} having a thickness of 15 nm is stacked as a ferromagnetic layer. According to this layer structure of the perpendicular recording layer, the ferromagnetic layer and the ferroelectric magnetic layer are not antiferromagnetically coupled, but are ferromagnetically coupled.

Characteristics of the comparison example Cmp2 are evaluated in the same manner as the comparison example Cmp1, and are also illustrated in Table 1.

Comparison Example Cmp3

In a comparison example Cmp3, the perpendicular magnetic recording medium is fabricated in a manner similar to the comparison example Cmp1 described above, except that the perpendicular recording layer is formed as follows. That is, a layer of (Co-13Cr-16Pt) 88 mol %-($SiO_2$) 12 mol % {Cr-content 13 at %, Pt-content 16 at %, remainder alloy of Co 88 mol %, oxide made of $SiO_2$ 12 mol %} having a thickness of 15 nm is stacked as a ferromagnetic layer.

Characteristics of the comparison example Cmp3 are evaluated in the same manner as the comparison example Cmp1, and are also illustrated in Table 1.

Comparison Examples Cmp4 through Cmp8

In comparison examples Cmp4 through Cmp8, the perpendicular magnetic recording medium is fabricated in a manner similar to the practical example Emb10 described above, except that the materials illustrated in Table 2 are used for the antiferromagnetic coupling layer 5. Characteristics of the comparison examples Cmp4 through Cmp8 are evaluated in the same manner as the practical example Emb10, and are also illustrated in Table 2.

By comparing the practical examples Emb1 and Emb6 with the comparison examples Cmp1 and Cmp2, it is confirmed that the SNR is significantly higher and the BER is lower when the antiferromagnetic coupling layer is provided between the ferromagnetic layer and the ferroelectric magnetic layer. This is because the magnetization of the ferroelectric magnetic layer is apparently canceled by the antiferromagnetic coupling, and the effects of magnetic noise is reduced.

By comparing the practical examples Emb1 and Emb6, it is confirmed that more satisfactory characteristics can be obtained in a case in which the ferroelectric magnetic layer is provided on the lower side of the ferromagnetic layer, because the distance between the reproducing element and the recording layer at the time of the reproduction is shorter for this case.

By comparing the practical examples Emb1 through Emb9, it is confirmed that the thickness of the ferroelectric magnetic layer is preferably 1 nm or greater and 50 nm or less, and more preferably 20 nm or less.

By comparing the practical examples Emb10 through Emb20 with the comparison examples Cmp4 through Cmp8, it is confirmed that the SNR is significantly higher and the BER is lower when the ferromagnetic layer and the ferroelectric magnetic layer are antiferromagnetically coupled. This is because the magnetization of the ferroelectric magnetic layer is apparently canceled by the antiferromagnetic coupling, and the effects of magnetic noise is reduced.

From the practical examples Emb21 through Emb35, it is confirmed that various materials may be used for the ferroelectric magnetic layer. In addition, from the practical examples Emb30 and Emb34, it is confirmed that more satisfactory characteristics can be obtained in a case in which the product (Ms·T) of the saturation magnetization (Ms) of the ferroelectric magnetic layer and the thickness (T) of the ferroelectric magnetic layer is 0.01 memu/cm$^2$ or greater.

From the practical examples Emb36 through Emb40, it is confirmed that a satisfactorily high SNR can be obtained when the backing layer 2 is provided between the bonding layer 8 and the underlayer 3. In addition, by comparing the practical examples Emb36 and Emb37 with the practical examples Emb38 through Emb40, it is confirmed that more satisfactory characteristics can be obtained when the backing layer is formed by a plurality of soft magnetic layers that are stacked, and the antiferromagnetic coupling is achieved by providing the nonmagnetic layer between the soft magnetic layers.

From the practical examples Emb41 through Emb45, it is confirmed that various magnetic materials may be used for the ferromagnetic layer. The provision of the antiferromagnetic coupling layer between the ferromagnetic layer and the ferroelectric magnetic layer makes the perpendicular magnetic recording medium suited for the high-density recording.

According to the embodiments and practical examples described above, it is possible to provide a perpendicular magnetic recording medium having a reproducing characteristic with a high SNR. In addition, by combining this perpendicular magnetic recording medium with a high-recording density head that generates an electric field, it is possible to provide a magnetic storage apparatus having a perpendicular magnetic recording medium with a high recording density.

What is claimed is:

1. A perpendicular magnetic recording medium comprising:
    a nonmagnetic substrate;
    an underlayer provided above the nonmagnetic substrate; and
    a perpendicular recording layer provided above the underlayer,
    wherein the perpendicular recording layer includes a first magnetic layer including Co and Pt and having a granular structure, and a second magnetic layer having magnetic and ferroelectric properties, and
    wherein the second magnetic layer is made of a material selected from a group consisting of $(Bi_{1-a}Ba_a)FeO_3$, $Bi(Fe_{1-b}Mn_b)O_3$, and $(Bi_{1-a}Ba_a)(Fe_{1-b}Mn_b)O_3$, where "a" is in a range of 0.3 to 0.5, and "b" is in a range of 0.3 to 0.8.

2. The perpendicular magnetic recording medium as claimed in claim 1, wherein the first magnetic layer is provided on a side closer to the nonmagnetic substrate than the second magnetic layer.

3. The perpendicular magnetic recording medium as claimed in claim 1, further comprising:
    a nonmagnetic metal layer provided between the first magnetic layer and the second magnetic layer.

4. The perpendicular magnetic recording medium as claimed in claim 1, further comprising:
    a soft magnetic backing layer provided between the nonmagnetic substrate and the underlayer.

5. A perpendicular magnetic recording medium comprising:
    a nonmagnetic substrate;
    an underlayer provided above the nonmagnetic substrate; and
    a perpendicular recording layer provided above the underlayer,
    wherein the perpendicular recording layer includes a first magnetic layer including Co and Pt and having a granular structure, and a second magnetic layer having magnetic and ferroelectric properties,
    wherein the first magnetic layer includes ferromagnetic particles including Pt and Co, and a boundary forming material including at least one material selected from a group consisting of Si oxides, Ti oxides, W oxides, Cr oxides, Co oxides, Ta oxides, B oxides, and Ru oxides.

6. A magnetic storage apparatus comprising:
a perpendicular magnetic recording medium; and
a head configured to record information on and reproduce information from the perpendicular magnetic recording medium,
wherein the perpendicular magnetic recording medium includes
  a nonmagnetic substrate;
  an underlayer provided above the nonmagnetic substrate; and
  a perpendicular recording layer provided above the underlayer,
wherein the perpendicular recording layer includes a first magnetic layer including Co and Pt and having a granular structure, and a second magnetic layer having magnetic and ferroelectric properties, and
wherein the second magnetic layer is made of a material selected from a group consisting of $(Bi_{1-a}Ba_a)FeO_3$, $Bi(Fe_{1-b}Mn_b)O_3$, and $(Bi_{1-a}Ba_a)(Fe_{1-b}Mn_b)O_3$, where "a" is in a range of 0.3 to 0.5, and "b" is in a range of 0.3 to 0.8.

7. The magnetic storage apparatus as claimed in claim 6, wherein the first magnetic layer of the perpendicular magnetic recording medium is provided on a side closer to the nonmagnetic substrate than the second magnetic layer.

8. The magnetic storage apparatus as claimed in claim 6, wherein the perpendicular magnetic recording medium further includes
  a nonmagnetic metal layer provided between the first magnetic layer and the second magnetic layer.

9. The magnetic storage apparatus as claimed in claim 6, wherein the first magnetic layer of the perpendicular magnetic recording medium includes ferromagnetic particles including Pt and Co, and a boundary forming material including at least one material selected from a group consisting of Si oxides, Ti oxides, W oxides, Cr oxides, Co oxides, Ta oxides, B oxides, and Ru oxides.

10. The magnetic storage apparatus as claimed in claim 6, wherein the perpendicular magnetic recording medium further includes
  a soft magnetic backing layer provided between the nonmagnetic substrate and the underlayer.

* * * * *